(12) United States Patent
Roycroft

(10) Patent No.: US 6,881,107 B2
(45) Date of Patent: Apr. 19, 2005

(54) AMPHIBIOUS VEHICLE COMPRISING AN IMPROVED DECOUPLER

(75) Inventor: Terence James Roycroft, Waiuku (NZ)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/333,536

(22) PCT Filed: Aug. 6, 2001

(86) PCT No.: PCT/GB01/03493

§ 371 (c)(1),
(2), (4) Date: Jun. 9, 2003

(87) PCT Pub. No.: WO02/14092

PCT Pub. Date: Feb. 21, 2002

(65) Prior Publication Data

US 2004/0092175 A1 May 13, 2004

(30) Foreign Application Priority Data

Aug. 12, 2000 (GB) ............................................. 0019782
Aug. 12, 2000 (GB) ............................................. 0019783

(51) Int. Cl.$^7$ ............................................. B63H 19/08
(52) U.S. Cl. ..................................................... 440/12.5
(58) Field of Search ........................... 440/12.5, 12.51, 440/12.52, 12.54, 12.57; 192/69.43; 74/359; 464/141, 145

(56) References Cited

U.S. PATENT DOCUMENTS 3,765,368 A * 10/1973 Asbeck ...................... 440/12.54
3,903,831 A * 9/1975 Bartlett et al. ........... 440/12.54
4,257,505 A * 3/1981 Stodt ......................... 440/12.51
4,549,872 A * 10/1985 Kumpar ....................... 464/141
4,958,584 A 9/1990 Williamson .................. 114/270
5,531,179 A * 7/1996 Roycroft et al. ........... 440/12.5
5,692,590 A 12/1997 Iihara et al. ............. 192/69.43
5,782,696 A * 7/1998 Guimbretiere .............. 464/145

FOREIGN PATENT DOCUMENTS

| DE | 15 30 577 | 12/1969 |
| DE | 42 05 997 C1 | 2/1992 |
| GB | 2 255 380 A | 11/1992 |
| JP | 55-92213 | 7/1980 |
| WO | WO 95/23074 7 | 8/1995 |

OTHER PUBLICATIONS

International Search Report dated Nov. 15, 2001.
Search Report of United Kingdom dated Feb. 8, 2001.
Search Report of United Kingdom dated Jan. 11, 2001.

* cited by examiner

Primary Examiner—Lars A. Olson
(74) Attorney, Agent, or Firm—Young & Basile, P.C.

(57) ABSTRACT

A decoupler for coupling/decoupling drive between a power train output and road wheels or marine drive means in an amphibious vehicle, is integrated with a constant velocity joint, saving space, weight, and cost for low production volumes, and simplifying mounting arrangements. Power train output shaft enters casing through aperture, and terminates in a flange with splines. Baulk ring and synchrocone provide synchromesh action between drive ring and driven CV joint cap. Rod is attached to selector arm, located in slot, allowing coupling and decoupling by an external control, which may be assisted by a pneumatic or hydraulic cylinder. The synchromesh parts may be sourced from truck gearboxes. CV joint is mounted in bearings, and may be a Rzeppa type. Groove allows fitment of a conventional dust gaiter.

6 Claims, 3 Drawing Sheets

AMPHIBIOUS VEHICLE COMPRISING AN IMPROVED DECOUPLER

BACKGROUND OF THE INVENTION

The present invention relates to an amphibious vehicle having a decoupler for coupling/decoupling a drive shaft of the vehicle, and more particularly to an amphibious vehicle having a drive-shaft decoupler for engaging and disengaging a drive shaft which driveably connects an output from a power train of the vehicle with the wheels or marine propulsion system of the vehicle.

It has been found convenient to drive the marine propulsion systems of an amphibious vehicle through the transmission by which the wheels are also driven. With this arrangement it is necessary to disengage the drive to the wheels while the drive to the marine propulsion is engaged when the amphibious vehicle is in water mode. It is also desirable to be able to decouple and couple the drive to the wheels and marine propulsion system independently of one another as the vehicle makes the transition between land and marine modes of travel.

In the case of a transmission which incorporates a final-drive and differential unit as an integrated part of the whole transmission, it would only be possible to incorporate a decoupler into the transmission by designing a new internal arrangement. For amphibious vehicles, which are used in specialized applications and are produced in relatively low volumes, a dedicated transmission would be prohibitively expensive.

Therefore, on an amphibious vehicle in which the engine drives the road wheels and the marine propulsion system through an integrated transmission/differential, it has been found necessary to provide external drive shaft decouplers to disconnect the drive between the differential and the driven wheels, and between the transmission and the marine propulsion system. Typically a decoupler is provided in the driveline between the transmission and each driven wheel. However, it is possible to use a decoupler in the driveline between the transmission and only one of the driven wheels, since disconnecting drive to one of the driven wheels will effectively disengage drive to both wheels due to the effects of the differential.

A problem with known external drive shaft decouplers is the amount of extra space they require. This is a particular problem in amphibious vehicles in which the wheels are designed to retract upwardly and inboard of the vehicle for use of the vehicle in water. In such vehicles the provision of wheel retraction systems and specialized suspension systems reduces the available space for external drive shaft decouplers.

A further problem which arises is the need to synchronise the speeds of the input and output means of the decoupler when drive is being coupled. This problem arises, for example, when the vehicle is preparing to leave the water with the wheels deployed. In these circumstances it is necessary for drive to be maintained to the marine propulsion system, in order to push the vehicle towards the shore, whilst drive to the road wheels is coupled. This enables the vehicle to propel itself out of the water using a combination of drive from the marine propulsion system and the road wheels. It is necessary, therefore, for the decoupler to have a clutch means to progressively engage the drive between the differential output of the transmission (which may be spinning at 1000 RPM), and a rotating assembly consisting of the drive shaft, brake disc, hub and wheel (which initially will be stationary in the water) representing the inertia to be overcome.

A similar problem arises when the vehicle enters the water, when it is desirable to couple drive to the marine propulsion system whilst drive to the road wheels is maintained. This enables a smooth transition from land to water-borne use of the vehicle but requires a stationary marine propulsion system to be coupled to a rotating power take-off shaft of the transmission.

Furthermore, where the decoupler is to be used in the driveline between the transmission and a drive shaft for a wheel of an amphibious vehicle, the decoupler must be capable of handling the high torque loads which are experienced by the drive shaft. For example very high torque loads are experience in such drive shafts when drive to the wheels is engaged, wherein engine torque (say 250 Nm) is multiplied by a first gear ratio (say 4:1) times a final drive ratio (say 3.5:1):

$$250 \times 4 \times 3.5 = 3500 \text{ Nm}$$

When shock-loads from wheel/ground-contact torque reactions are factored in, it is common to allow for 10–12,000 Nm peak torque loads for the drive shafts of an average sized road vehicle.

It is an object of the invention to provide an amphibious vehicle having a decoupler which is capable of meeting the above requirements and which requires less space than known decouplers.

SUMMARY OF THE INVENTION

In accordance with the invention there is provided an amphibious vehicle comprising a decoupler for coupling/decoupling drive between an output from a the vehicle power train and a component to be driven, characterised in that the decoupler comprises a synchroniser adapted to synchronise the speed of an input means and an output means of the decoupler when drive is being coupled, and in that the decoupler forms part of an integrated unit also comprising a constant velocity joint.

By integrating a decoupler with synchroniser and a constant velocity joint into a single unit, the integrated unit can be positioned in the space usually taken up by a conventional constant velocity joint. Thus, the integrated unit requires less space than would be the case if a separate decoupler and constant velocity joint were to be used. Furthermore, there is a reduction in the number of components required and the mounting arrangements are simplified. This reduces the weight of the vehicle, the manufacturing and assembly costs of the vehicle and improves reliability.

In a particularly preferred embodiment the synchroniser is a synchromesh device comprising a baulk-ring and a cone, the baulk-ring and cone of the synchroniser providing a graduated drive engagement means.

This arrangement has the added advantage that a known synchromesh device from a conventional gearbox can be adopted for use in the decoupler. This enables the synchroniser device of the decoupler to be manufactured using commercially available components at much lower cost than would be the case if the components were to be purpose designed and manufactured.

Whilst known synchromesh devices, as found in a conventional manual gearbox, perform the tasks of clutching and coupling/decoupling in a combined operation as an integrated mechanism, such devices have not previously been employed for other than their designed purpose of manual gear selection inside the conventional gearbox. In this respect it should be noted that the inertia loads residual in gearbox internal shafting are very much lower than those of a drive shaft and wheel submerged in water. Also drive torque in a gearbox is not subject to final-drive multiplication and extreme wheel-to-ground shock-loading.

However, extensive analysis and tests have indicated that the clutching requirement of a drive shaft decoupler for an amphibious vehicle could be sustained by a synchromesh comprising a baulk-ring and synchro-cone, provided it is subjected to a greatly reduced number of application cycles than that normally experienced in the life of a gearbox.

Subsequent extensive testing based on the precise requirements of a drive shaft decoupler for an amphibious vehicle with regard to inertia loadings, road-load inputs, torsional vibration frequencies, and amphibious duty-cycles, have proved that a heavy goods vehicle gearbox synchromesh is capable of performing these unaccustomed tasks of high-inertia clutching and high-torque coupling, while fitting within the cost and space specifications when designed into a dedicated decoupler casing as shown herewith.

BRIEF DESCRIPTION OF THE DRAWINGS

An embodiment of the present invention will now be described by way of example only with reference to the accompanying drawings in which.

DETAILED DESCRIPTION OF THE PREFERRED EMBODIMENT

Figure 1:
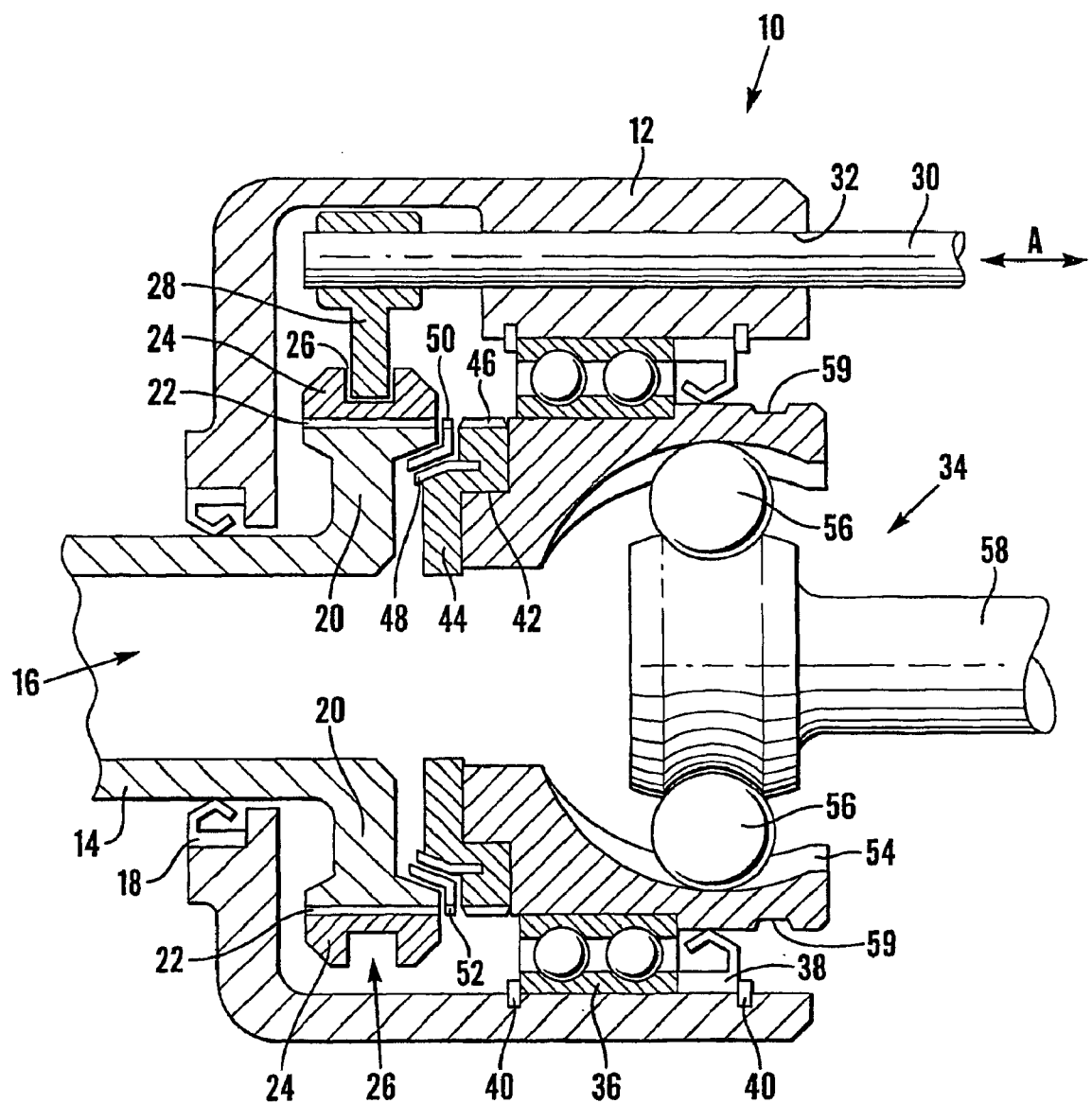
FIG. 1 is a section through a decoupler of an amphibious vehicle in accordance with the invention, the decoupler is shown in the position in which drive is disengaged or decoupled.

Referring firstly to FIG. 1, a decoupler incorporating a constant velocity CV joint is indicated generally at 10. The decoupler 10 is of the form of an integrated unit, which is housed in a casing 12. A driving shaft 14, which may be from the output stage of a gearbox or from a differential (not shown), enters the casing 12 through a circular aperture 16 to the left hand side of the casing 12 (as viewed), and is free to rotate within the casing. An oil seal 18 seals between the driving shaft 14 and the aperture 16. The driving shaft 14 comprises an input of the decoupler 10.

The driving shaft 14 terminates inside the casing 12 in a flange 20, the periphery of which is splined 22. A drive ring 24, which is correspondingly internally splined, is in permanent driving engagement with the spline 22 and rotates with the driving shaft 14. A circumferential slot 26 is provided in the periphery of the drive ring 24, and a selector arm 28 locates in the slot 26. A rod 30, which is mounted for reciprocating movement, indicated by arrow A, in a bore 32 of the casing 12, mounts the selector arm 28 at one end. A linkage (not shown) is provided to enable an operator of an associated vehicle (80, FIG. 3) to selectively slide the rod 30 and selector arm 28 to a required position. Alternatively the movement of the rod 30 can be remotely controlled by means of a pneumatic or hydraulic cylinder (not shown).

A CV joint indicated generally at 34 is rotatably mounted in ball bearings 36 in the right hand side of the casing 12 (as viewed). An oil seal 38 seals between the casing 12 and the CV joint 34, with the roller bearings 36 sealed in a protected position inside the casing 12. The oil seal 38 and the roller bearings 36 are positionally aligned and supported in the casing 12 by a pair of circlips 40.

The end of the CV joint 34 facing the flange 20 of the driving shaft 14 is stepped at 42. A stepped cap 44 is rigidly mounted on the stepped end 42. The periphery of the outer step of the cap 44 is splined at 46, and the periphery of the inner step is provided with a synchrocone 48. The spline 46 has the same form as the spline 22.

A baulk ring 50 formed as a truncated cone extending into a flange, is located between the stepped cap 44 of the CV joint 34, and the flange 20 of the driving shaft 14. The periphery of the flange of the baulk ring 50 is splined at 52, and the spline 52 also has the same form as the splines 22 and 46. The flange 20, the baulk ring 50 and the outer step of the cap 44 are of the same diameter and are concentric.

The CV joint 34 is of the "RZEPPA" type, and comprises splines 54, a plurality of roller balls 56, and a driven shaft 58 which comprises an output of the decoupler. Typically there are three or four roller balls 56 mounted in equally spaced arrangement about the periphery of the end of the drive shaft 58. Tie CV joint 34 is capable of an articulation of up to 45° away from the axis of the driving shaft 14 and includes a conventional dust gaiter (not shown) which extends between the drive shaft 58 and a groove 59 provided in the body of the CV joint 54.

Although in the preferred embodiment the CV joint is of the Rzeppa type, it should be understood that any suitable type of CV joint could be used. For example, the CV joint could be any of the following: Tracta, Weiss, Tripode, AC, VL, UF, UFC, GI, GE, GIC, ARR or Triplan type.

The operation of the decoupler 10 will now be described with reference also to FIG. 2. In FIG. 1 the decoupler 10 is shown uncoupled and coupling is effected by movement of the rod 30 to the right as viewed. As the rod 30 is moved, for example, by a hydraulic cylinder, (not shown) the selector arm 28, which is engaged in the circumferential slot 26 of the drive ring 24, moves the drive ring 24 in the spline 22 towards the CV joint 34. The internal spline of the drive ring 24 engages the spline 52 of the baulk ring 50, and pushes the baulk ring 50 onto the synchro-cone 48. The baulk ring 50 rotates at the speed of the driving shaft 14 and the frictional contact between the conical part of the baulk ring 50 and the synchro-cone 48, synchronises the speed of the stepped cap 44 and the CV joint 34 with the speed of the driving shaft 14. The arrangement of the baulk ring 50 synchro-cone 48 and drive ring 24 is commonly known as a synchromesh device.

Figure 2:
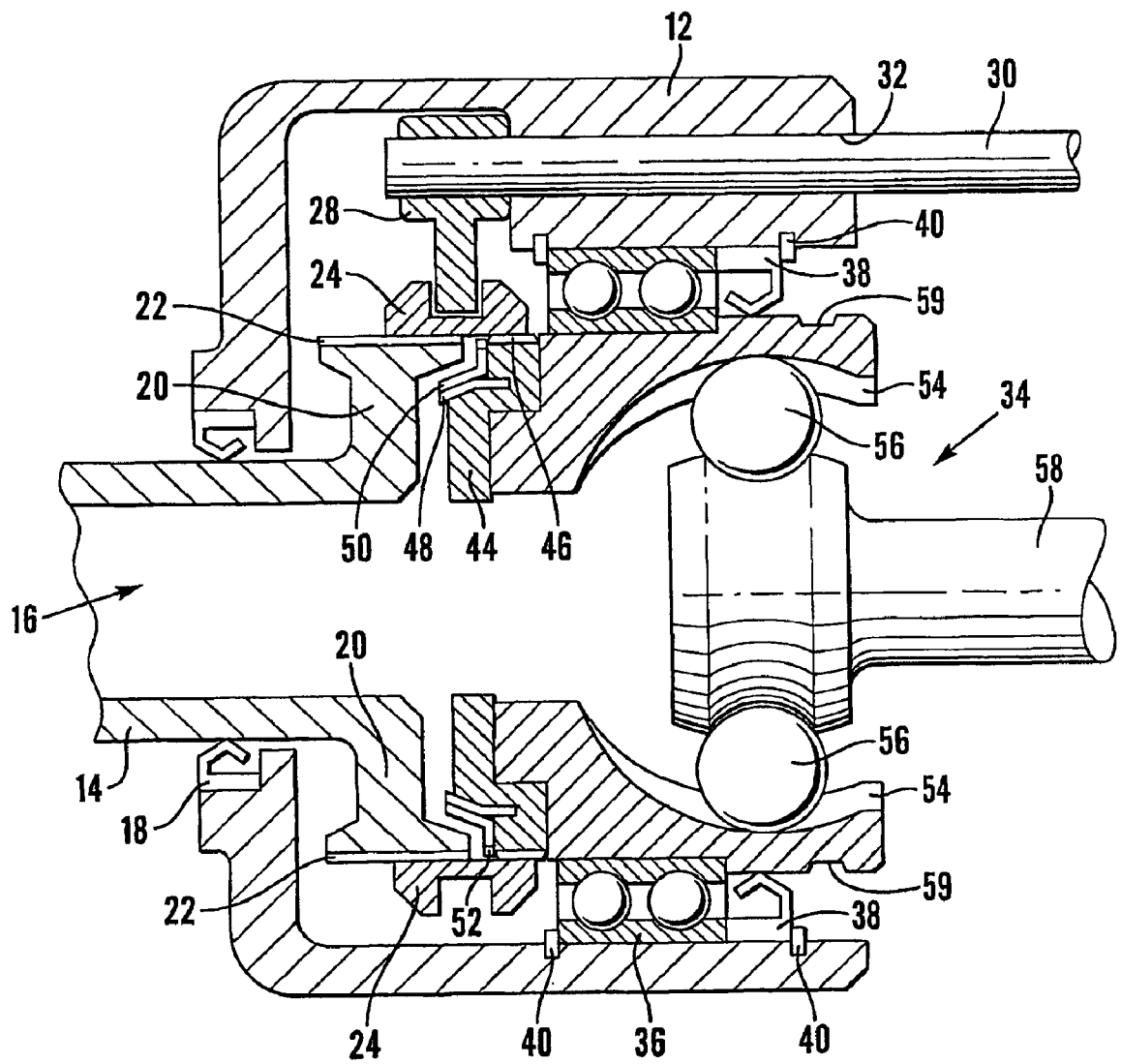
FIG. 2 is view similar to that of FIG. 1 but showing the decoupler in the position in which drive is engaged or coupled.

Further movement of the drive ring 24 by the selector arm 28 causes the drive ring 24 to slide to a position engaging both the spline 46 of the cap 44 and the spline 22 of the driving shaft flange 20, as shown in FIG. 2. The full torque of the driving shaft 14 can then be passed through the drive ring 24 to the driven shaft 58 of the CV joint 34.

Figure 3:
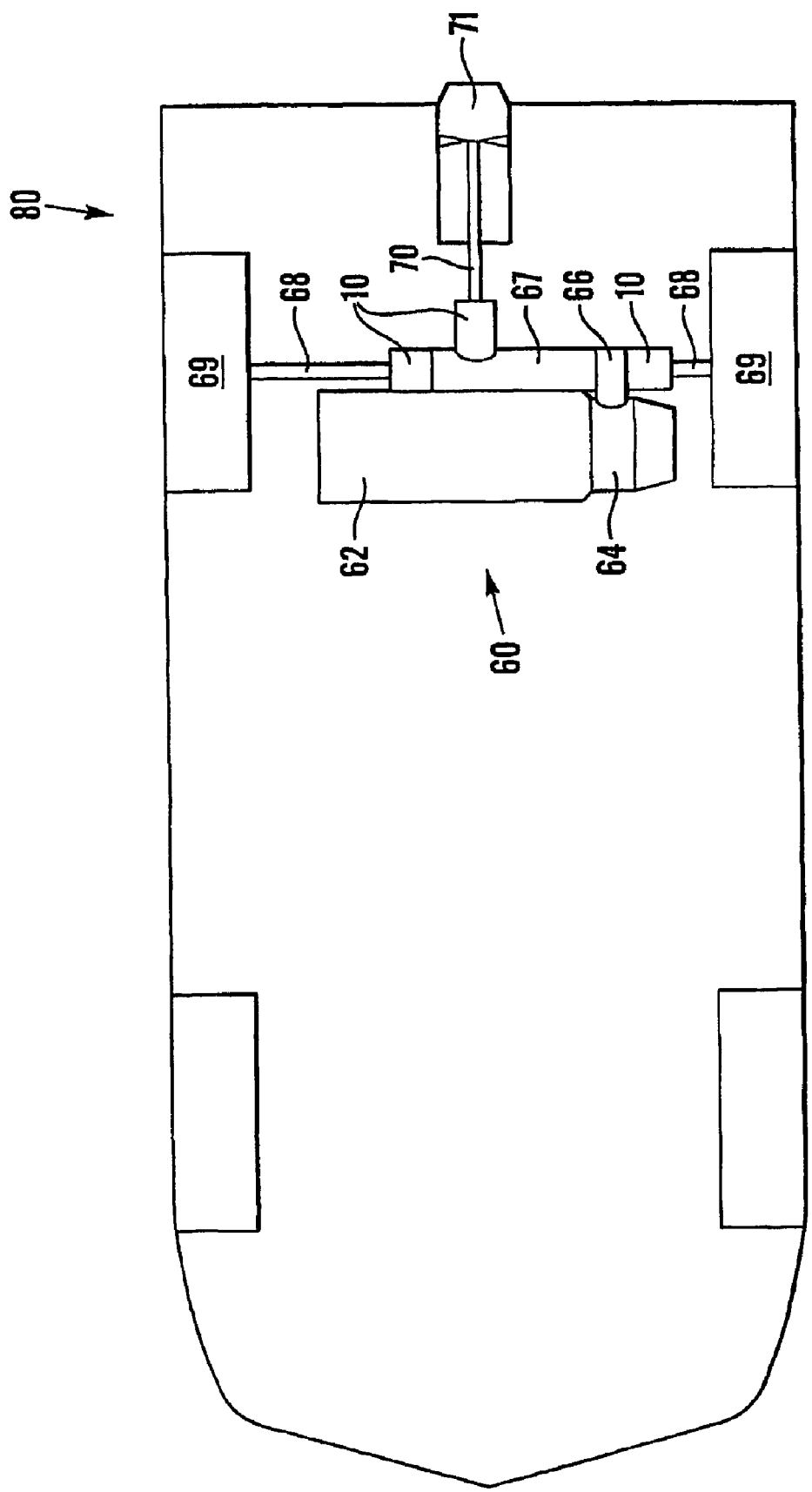
FIG. 3 is a schematic plan view in section of an amphibious vehicle in accordance with the invention, showing a drive train including an engine, gearbox and three decouplers of the type shown in FIGS. 1 and 2.

Referring now to FIG. 3, an amphibious vehicle, indicated generally at 80, has a transverse power train 60. The power train 60 comprises an engine 62, an in-line gear box 64, a differential unit 66 driven from the gearbox and a transfer gearbox 67 driven from the differential. Drive is provided from the differential to a pair of drive shafts 68 which drive the rear wheels 69 of the vehicle, and from the transfer gearbox 67 to a third shaft 70 which drives a marine propulsion system in the form of a water jet 71. A decoupler 10, of the kind described above in relation to FIGS. 1 and 2, is provided between each of the rear wheel drive shafts 68 and the differential 66 and between the drive shaft 70 and the transfer gearbox 67. The decouplers 10 allow drive to be selectively and independently connected between the differential 66 and each of the rear wheel drive shafts 68 and between the transfer gearbox and the water jet drive shaft 70. In the arrangement shown, the drive shafts 68, 70 comprise the same part as the drive shaft referenced 58 in FIGS. 1 and 2.

In the embodiment shown in FIG. 3, a decoupler 10 is provided for each of the rear wheel drive shafts 68. However, in an alternative embodiment, a decoupler 10 may be provided for only one of the rear wheel drive shafts 68, the other drive shaft 68 being provided with a conventional CV joint or the like. Those skilled-in the art will readily understand that decoupling drive to one of the rear wheels will effectively disengage drive to both of the rear wheels, due to the effects of the differential 66.

Similarly, it may not be considered essential to provide a decoupler in the marine propulsion system drive, as it is feasible to allow the marine propulsion unit to freewheel when the amphibious vehicle is driven in road mode. This entails a small loss of power, which is undesirable; but allows simplification of the marine drive train.

Some amphibious vehicle power trains do not require any road wheel decouplers. These include power trains where the marine power takeoff is upstream of the road wheel transmission. For example, a sandwich power takeoff may be used between the engine and transmission, as shown in FIG. 1 of our co-pending application no. GB0020887.6. In this case, road wheel decouplers are not required, because drive to the road wheels can be decoupled simply by placing the gearbox in neutral gear.

Road wheel decouplers are also not required where the marine power takeoff is from the timing end of the crankshaft, for example according to FIG. 2 of our co-pending application no. GB0021007.0.

It will be understood from the above that although FIG. 3 shows an amphibious vehicle with a transverse engined power train, the decoupler 10 is equally suitable for use with a longitudinally engined power train or indeed any power train arrangement suitable for use in an amphibious vehicle.

The decoupler 10 is especially suitable for use in an amphibious vehicle because of the limited space around the engine and drive shafts, and the need to keep the weight of the vehicle to a minimum.

It is not intended that the decoupler 10 be used to couple drive between the transmission and the wheels when the vehicle is on land when the torques to be coupled would be high. Rather, it is intended that the decoupler 10 will be used to couple drive to the wheels when the vehicle is afloat in water and the wheels (not shown) are able to spin almost unimpeded. By the time that the wheels reach land, the driving ring 24 of the decoupler 10 is fully engaged with the spline 46 of the CV joint. Furthermore, coupling of the drive shaft 70 and of the wheel drive shafts 68 will occur when the gearbox is in low gear, with the engine running at low speed. This reduces the inertia to be overcome in synchronising speeds of the drive shafts 68, 70 with the driving shaft 14.

What is claimed is:

1. An amphibious vehicle comprising a power train and a decoupler for coupling/decoupling drive between an output from the vehicle power train and a component to be driven, the coupler including an input means, an output means and means for coupling drive between the input means and the output means characterised in that the decoupler further comprises a synchroniser to synchronise the speed of the input means and the output means when drive between the output and input means is being coupled, and in that the decoupler forms part of an integrated unit also comprising a constant velocity joint.

2. An amphibious vehicle as claimed in claim 1, in which the synchroniser is a synchromesh device comprising a baulk-ring and a cone, the baulk-ring and cone of the synchromesh device providing a graduated drive engagement means.

3. An amphibious vehicle as claimed in claim 2 in which a first set of splines is formed on the input means and a second set of splines is formed on the output means, the decoupler further comprising a drive ring having an inner surface on which is formed a third set of splines which are in permanent driving engagement with the splines on the input means, the drive ring being moveable between a first position in which the splines on the drive ring are in engagement with the splines on the input means but not with the splines on the output means, and a second position in which the splines on the drive ring are in engagement with the splines on the input means but not with the splines on the output means.

4. An amphibious vehicle as claimed in claim 3, in which the cone is provided on the output means and the baulk ring is arranged between the cone and the input means, a fourth set of splines being provided on the baulk ring, the arrangement being such that as the drive ring is moved from the first position to the second position, the splines on the drive ring engage the splines on the baulk ring so that the baulk ring is rotated with the input means and is pushed into frictional contact with the cone.

5. An amphibious vehicle as claimed in claim 1 in which the constant velocity joint comprises the output means.

6. An amphibious vehicle as claimed in claim 1 in which the constant velocity joint is a "RZEPPA" type joint.

* * * * *